Figure 1:
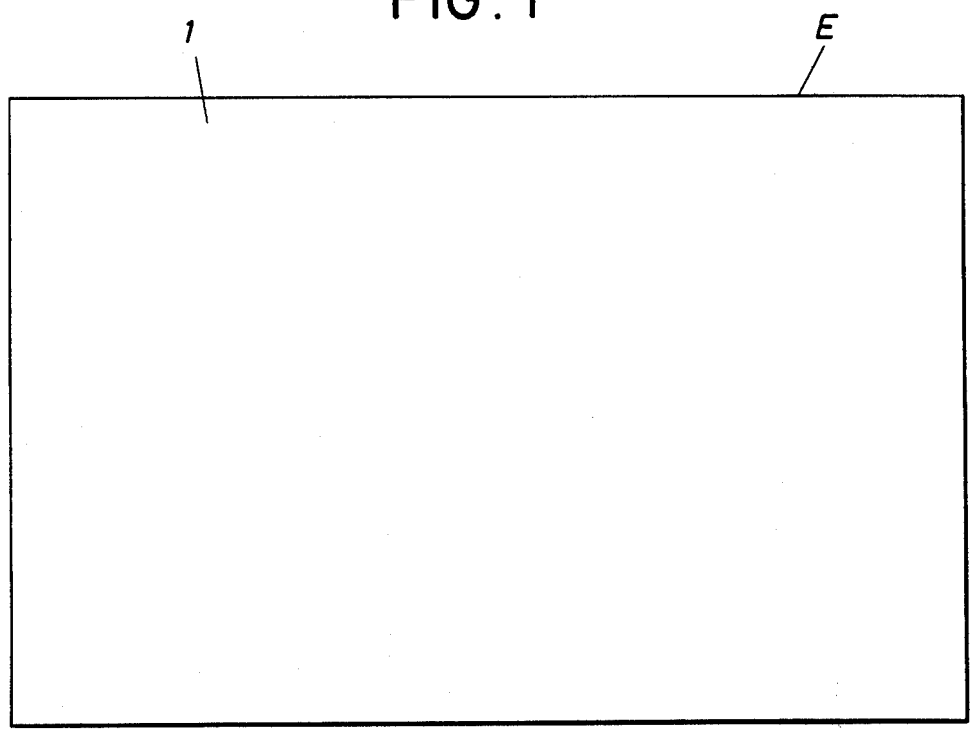

United States Patent [19]

Tschudin

[11] 4,261,775

[45] Apr. 14, 1981

[54] METHOD OF DEEP-DRAWING OF FOAM MATERIAL-MOLD PARTS

[75] Inventor: Rolf Tschudin, Münchenstein, Switzerland

[73] Assignee: Irbit Holding AG, Fribourg, Switzerland

[21] Appl. No.: 3,157

[22] Filed: Jan. 15, 1979

[30] Foreign Application Priority Data

Jan. 23, 1978 [DE] Fed. Rep. of Germany ....... 2802781

[51] Int. Cl.³ .......................... B32B 1/10; B29C 17/04
[52] U.S. Cl. ..................................... 156/183; 156/224; 156/245; 264/512; 264/547; 264/554
[58] Field of Search ............... 264/510, 512, 515, 553, 264/554, 547; 156/183, 224, 245

[56] References Cited

U.S. PATENT DOCUMENTS 3,039,911  6/1962  Fox ................................. 264/553 X
3,971,866  7/1976  Johnson .......................... 264/512 X

FOREIGN PATENT DOCUMENTS 1161456  9/1958  France ................................. 264/547
1266534  6/1961  France ................................. 264/510

Primary Examiner—Jan H. Silbaugh
Attorney, Agent, or Firm—Martin A. Farber

[57] ABSTRACT

A method of deep drawing of foam material mold parts made of flat foamed plates, by which the plate which is clamped in a frame is heated on both sides and is sucked against the upper side of a core piece which moves into the plane of the frame, the upper side corresponding to the profile of the mold. The suction takes place with an intermediate placement of a foil, the latter being adhesive material—repelling at least on its interior side. The foil is fastened to the foam material plate by means of a self-adhesive layer.

3 Claims, 8 Drawing Figures

U.S. Patent   Apr. 14, 1981   Sheet 3 of 3   4,261,775

METHOD OF DEEP-DRAWING OF FOAM MATERIAL-MOLD PARTS

The invention relates to a method of deep drawing of aerated plastic or foam material mold parts made from flat foam plastic plates, with which the plate which is clamped in a frame is heated on both sides and is sucked in against the upper side of a core piece which moves into the plane of the frame, the upper side corresponding to the profile of the mold.

The produced formed parts are adhered on walls which are to be insulated, either by the application of adhesive on the wall or on the formed part. This is round about and troublesome, time consuming and a quantity provision practically can not be performed.

It is a object of the invention to provide a method which makes possible a provision of adhesive even before the deformation of the foamed plates.

This task is solved in accordance with the invention in the manner that suction takes place with an intermediate placement of a foil, the latter being adhesive material repelling at least on its interior side, the foil being fastened to the foamed plate by means of a self-adhesive-layer. In accordance with the invention it is advantageous to bulge out the connecting unit, which is clamped in the frame and which comprises the foamed plate, self-adhesive layer and foil, before introduction of the core piece, into the shape of a dome which is concave relative to the core piece.

As a consequence of such an embodiment a most extremely economical method for the deep drawing of foam material—formed parts can be realized, which method is able to be performed practically with devices which already are in use. The foil which forms part of the connection unit constitutes a membrane which is most advantageous to be used for same during the suction deep drawing operation. The membrane guarantees a very tight seal, so that even very bizarre formed parts can be drawn precisely. Thus the foil has multiple function going beyond the actual protective functions for a self-adhesive layer. The later release of this foil is possible by being adhesive-repelling by siliconization on the inner side, i.e. the side facing the adhesive layer. The corresponding position of the foil permits it to be used next to foamed material having closed cells, even indeed high-porous types. The intermediate positioning of a foil is also advantageous for the molds, insofar as it arrives smoothly and thereby a foil with very advantageous slide characteristics arrives up to the deepest slots of the core piece, whereas with a direct contact of the foamed on the core, friction effects can occur which lead certainly to distortions. The deformation of the connection unit, which comprises the foam material plate, self-adhesive layer and foil takes place exceptionally homogeneously and with the lowest expenditure of time. Corresponding molding times even are less than one second. The self-adhesive layer fully participates in or follows this deformation. As was found, the adhesive-action of the adhesive on the foamed material is indeed not increased. The application of the adhesive quantity is 120 to 150 g. per m². The thickness of the layer of the adhesive reduced by the stretching. Heat and stretching keep the adhesive film free from breaking, that is remaining intact. Even with a high degree of expansion still practically no relative displacement occurs between the foam material plate and the foil. The foil and the adhesive layer remain in adhesive connection. Distortions do not occur. First of all there already occurs a uniform initial expansion of the entire surface to be deformed, in the manner that before the core piece moves-in, the connection unit comprising the foam plate, self-adhesive layer and foil is bulged out into a bubble or dome, concave relative to the core piece. Such a dome forms if the mold table is formed as a chamber. The heat source then lying thereunder in this chamber, by means of the air expansion, causes an above atmospheric pressure which curves the membrane outwardly.

Figure 2:
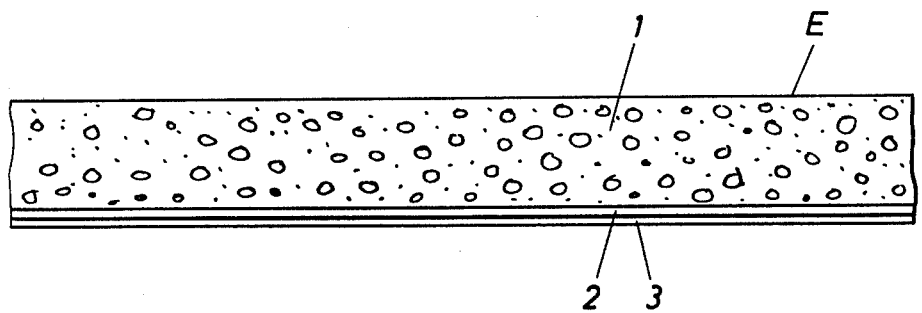
Figure 3:
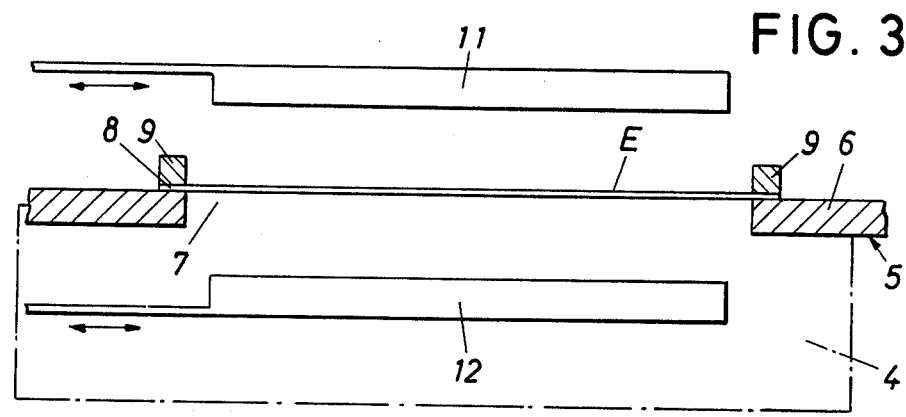
Figure 6:
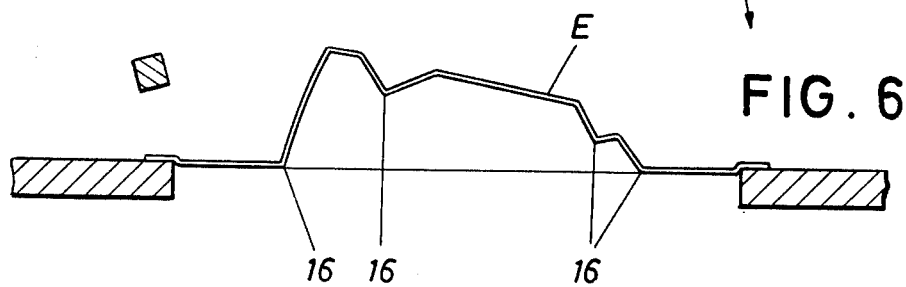
Figure 7:
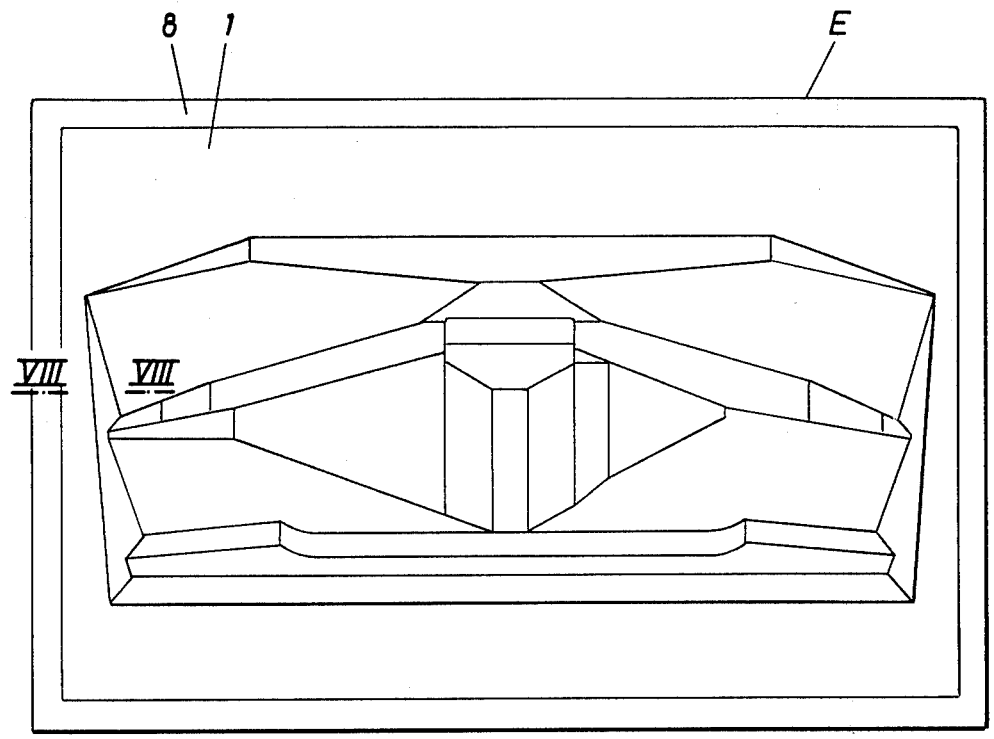
Figure 8:
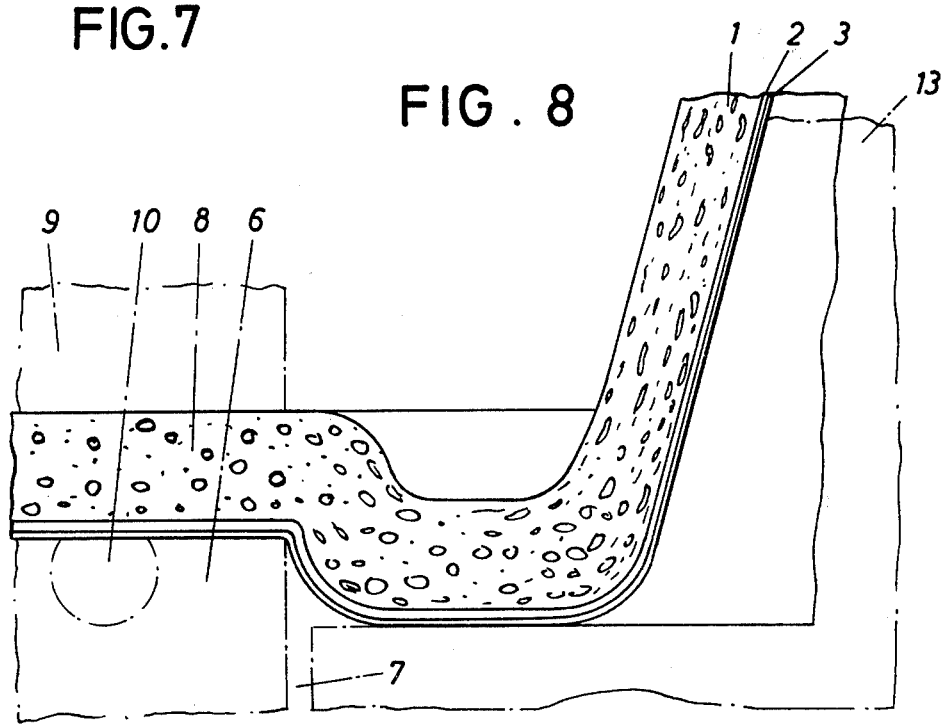

With the above and other objects and advantages in view, the present invention will be more clearly understood when considered with the accompanying drawings, of which:

FIG. 1 is a plan view of the unformed compound connection unit which is made of the foam material plate, self-adhesive layer and foil, FIG. 2 is an enlarged section compared to FIG. 1 through the connection unit, FIGS. 3–6 show the deep drawing device in the four main phases of manufacture, FIG. 7 is a top plan view of the product, and FIG. 8 is a section according to the lines VIII—VIII in FIG. 7.

For performance of the method in accordance with the invention as connection unit E is used which comprises a flat surface foam material (aeriated plastics or cellular or spongy plastics) plate 1 with an adhesive layer 2 which is applied on the bottom side, the adhesive layer being covered by a protective foil 3.

The foam material plate 1 is made of polyethylene. It has a thickness of approximately 6 mm.

The foil is also made of polyethylene. Its thickness is approximately 1/10 mm.

The adhesive is a usual commercial product which does not lose its stretchability with heating, or respectively, is still stretchable upon heating. The surface unit amounts to 120–150 g. per m².

The device for performing the method is shown in FIGS. 3–6 in highly schematic illustration. It is made of an base support 5 forming a chamber 4. Its mold table 6 has an opening 7 which corresponds to the rectangular peripheral shape of the connection unit E. The connection unit E is dimensioned such that its edge zone 8 overlaps the opening edge of the mold table by approximately 4–6 cm. A clamping or tenter frame 9 arranged at the upper side of the table secures the laid-on combination or compound unit, the clamping frame 9 being approximately the width of the edge zone 8 which frame is arranged at the upper side. This clamping frame is articulated in the rear of the mold table and is automatically controlled in the clamping position. The foil 3 of the flat surface compound unit E faces down, i.e. in the direction of the chamber 4. The support surface on the side of the form table, more exactly called the opening edge of the mold table is formed correspondingly smooth, so that a very tight sealing closure is achieved. Additionally a compressible sealing rib 10 which projects over the upper surface of the mold table yet can be applied around the entire periphery of the opening.

The thus clamped combination unit is now heated on both sides. In addition heating sources 11 and 12, which are arranged correspondingly above and below, move in the range of this combination unit. They are electrical resistance heaters. These heaters are regulatable in their heat emission. Particularly in addition to the horizontal feed, a vertical shiftability or adjustability is also provided.

Figure 4:
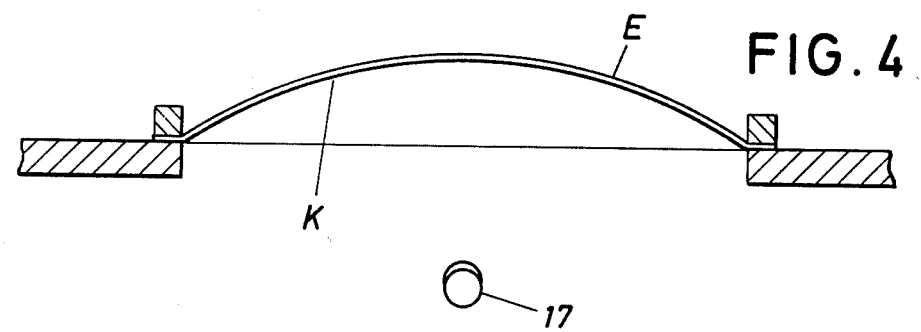
Figure 5:
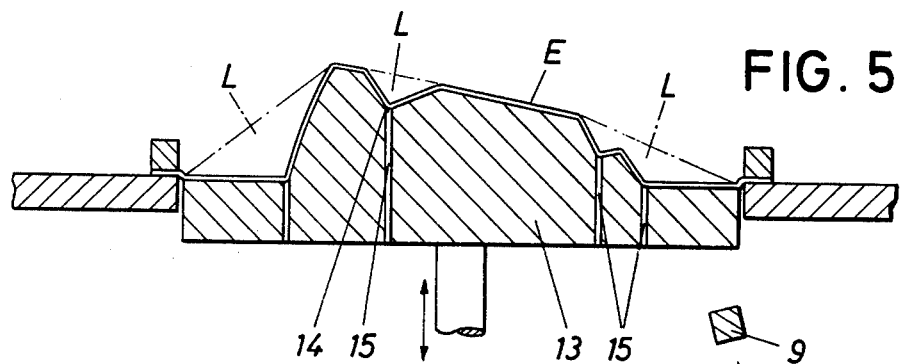

In the following phase according to FIG. 4 the heating sources 11 and 12 again move back into their initial or normal position. The heating of the air which is located in the chamber leads to an expansion of same with the consequence that the membrane-like intermediate layer in the form of the foil 3 swells or bulges the combination unit E into a dome K.

Above all with bizarre mold cores this provides a favorable initial roughening of the construction unit, the initial roughening being distributed along the entire surface unit. In order to maintain the external heating for a longer time because of the direct connection with the relatively cooler atmosphere or surrounding air, the upper heating source can be withdrawn somewhat later.

In connection with this the core piece 13 which is held on the bottom side of the chamber 4 in readiness moves up. The core piece penetrates into the dome or bubble of the construction unit E, which dome and bubble are concave relative to the core piece 13. The inlets 14 of the vacuum pressure lines 15 are located at the deepest positions of the core piece. These below-atmospheric pressure lines 15 suck in the residual air L between the combination unit and the upper surface of the core piece. The combination unit conforms to the contour of the core piece with residual expansion. Here the foil which lies on the core piece proves to be an extremely slidable surface. The foamed material plate is drawn along, the foamed plate is still in the deformable condition and is held on the foil 3 by means of the self-adhesive layer. In every phase the adhesive forms a surprising considerably stressable binding bridge between the foam material plate 1 and the foil. The adhesive force of the self-adhesive layer on the side of the foam material plate is greater than on the side of the foil. The foil indeed is also adhesive-repelling on its inner side by means of siliconization, so that the foil which also forms the protective covering can easily be pulled off later. In spite of the adhesive-repelling inner side of the foil, yet with deep drawing there occurs no detachment of the foil from the foamed material plate which is located at the outside.

Now the cooling of the produced formed part takes place. This occurs by means of one or more cold air blowers 17. Their nozzles are directed on the upper surface.

By means of an air blast which can be fed via the channels 15 or additional channels, which air blast occurs between the foil and the upper surface of the mold core, the formed part is detached quickly and respectively lifted from the core piece 13. Thereafter the core piece again moves downwardly. After releasing folding up of the clamping frame 9, the finished product can be removed from the device.

The above-described operations are completely automatically controllable. Likewise the planar combination units can be cut to length by a roller and can be fed to the device.

The inner edges 16 of the formed part which are on the adhesive have a slight roughness, and respectively wrinkling or crinkling. Since these inner edges 16 mostly are used as orientation lines during the sticking-on of the formed part, the adhesive layer at first only partially goes into adhesive connection with the surface, so that under the circumstances if necessary corrections in position are still possible. If the formed part is brought into its proper position, now the entire adhesive surface can be brought into adhesive connection.

Large surface formed parts are divided for easier placement. This can take place by means of the mounting ends. In such cases the core piece can have corresponding notch marks which leave slight, yet visible impressions in the foil.

On the other hand the cutting out can occur even on the mold table by the punching tool which is provided there.

As evident from FIG. 8, as a consequence of the expansion, the walls of the formed part are somewhat thinner in cross-section in the deeper drawing zones. This applies in principle even with respect to the self-adhesive layer 2 and to the foil 3 which forms the intermediate layer and membrane, respectively.

The character of the mold as it is evident from FIGS. 6 and 7 needs no further detailed explanation, since it relates to a special mold which can be considerably varied depending upon shapes of the walls of the areas to be insulated and covered or lined for sound insulation, respectively.

I claim:
1. A method of deep drawing of a foamed material shaped part made of a flat foam material plate, comprising the steps of
    providing a plate made of soft closed cell foam in a frame, the foam having a plastic foil thereon at the bottom thereof below the foam and the latter being fastened by a pressure-sensitive self-adhesive layer between said foil and said foam, said foam, adhesive layer and said foil constituting a connection unit, said foil being adhesive material repelling at least on its interior side,
    clamping said connecting unit,
    heating the clamped connecting unit on both sides and bulging said connecting unit out into an upwardly arching dome prior to a deep drawing operation,
    immediately after the bulging, drawing the plate with the foil and adhesive layer from the bottom under the foil against an upper side of a core piece having depressions with deepest portions communicating with a vacuum source by moving the core piece into the plane of the frame under the foil and effecting suction with said vacuum source, the upper side of the core piece corresponding to the profile of the shaped part to be produced, whereby the connecting unit is drawn to conform to the upper side of the core piece, and producing crinkling at innermost edges of the connecting unit including the plate and adhesive layer adjacent the deepest portions of the depressions of the core piece.
2. The method as set forth in claim 1, further comprising the step of
    sealing said connecting unit in the clamping operation with said foil to provide an air-tight inner chamber so that by the heating step the air in the chamber expands thereby causing the bulging of said connecting unit, the foil being easily slidable relative to said upper side of the core piece and impermeable.
3. The method as set forth in claim 2, wherein
    said connecting unit is formed by first applying the adhesive layer on the bottom of said plate of soft closed cell foam and thereafter placing said foil on said adhesive layer.

* * * * *